US011140012B2

(12) United States Patent
Finkelstein

(10) Patent No.: US 11,140,012 B2
(45) Date of Patent: *Oct. 5, 2021

(54) SYSTEM AND METHOD FOR AN IMPROVED COMMUNICATION CHANNEL

(71) Applicant: Cox Communications, Inc., Atlanta, GA (US)

(72) Inventor: Jeffrey L. Finkelstein, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/842,609

(22) Filed: Apr. 7, 2020

(65) Prior Publication Data

US 2020/0235978 A1 Jul. 23, 2020

Related U.S. Application Data

(63) Continuation of application No. 15/651,816, filed on Jul. 17, 2017, now Pat. No. 10,637,704.

(51) Int. Cl.
| H04L 5/00 | (2006.01) |
| H04L 27/26 | (2006.01) |
| H04L 27/34 | (2006.01) |
| H04B 3/04 | (2006.01) |
| H04W 24/08 | (2009.01) |
| H04L 1/00 | (2006.01) |

(52) U.S. Cl.
CPC .......... *H04L 27/2627* (2013.01); *H04B 3/04* (2013.01); *H04L 5/006* (2013.01); *H04L 5/0046* (2013.01); *H04L 5/0062* (2013.01); *H04L 27/2646* (2013.01); *H04L 27/34* (2013.01); *H04L 1/0003* (2013.01); *H04W 24/08* (2013.01)

(58) Field of Classification Search
CPC ... H04L 27/2627; H04L 27/34; H04L 5/0062; H04L 1/0003; H04L 5/006; H04L 5/0046; H04L 27/2646; H04W 24/08; H04B 3/04
See application file for complete search history.

(56) References Cited

U.S. PATENT DOCUMENTS

2003/0086371 A1* 5/2003 Walton ................. H04L 1/0025
370/235
2004/0048574 A1* 3/2004 Walker .................. H04L 5/003
455/63.1

(Continued)

*Primary Examiner* — Syed Haider
(74) *Attorney, Agent, or Firm* — Eversheds Sutherland (US) LLP

(57) ABSTRACT

The systems and methods disclosed herein are generally directed to the real-time symbol rate of modulation modification based on noise and interference detection on a received signal during data transmission across a network. In one embodiment, a receiving device can measure the power of affected carriers, subcarriers, and/or tones. In one embodiment, adaptive bit loading can be used such that a lower order modulation scheme can be used to overcome through the noise and increase the Signal-to-noise ratio (SNR) of the transmitted signal. In one embodiment, more throughput (for example, more bps/Hz) can be achieved in the network by using subcarriers that have a higher SNR. Further, the bit-loading can serve to maximize the data rate subject to power and bit-error ratio (BER) constraints of the network.

18 Claims, 8 Drawing Sheets

(56) References Cited

U.S. PATENT DOCUMENTS

| | | | |
|---|---|---|---|
| 2014/0301318 A1* | 10/2014 | Luo | H04L 5/0064 |
| | | | 370/329 |
| 2015/0222449 A1* | 8/2015 | Salinger | H04L 27/0002 |
| | | | 370/419 |
| 2015/0351109 A1* | 12/2015 | Naim | H04W 36/30 |
| | | | 455/509 |

* cited by examiner

SYSTEM AND METHOD FOR AN IMPROVED COMMUNICATION CHANNEL

CROSS-REFERENCE TO RELATED PATENT APPLICATION

The present application is related to and claims priority from U.S. patent application Ser. No. 15/651,816, filed Jul. 17, 2017.

BACKGROUND

Orthogonal frequency-division multiplexing (OFDM) can refer to a method of encoding digital data on multiple carrier frequencies. In OFDM, sub-carrier frequencies can be chosen so that the sub-carriers are orthogonal to each other. In such cases, cross-talk between the sub-channels may be reduced and inter-carrier guard bands may not be required. OFDM can be used for digital communication, used in applications such as digital television and audio broadcasting, DSL Internet access, wireless networks, powerline networks, and mobile communications.

Further, an OFDM carrier signal can be the sum of one or more orthogonal sub-carriers and/or tones. Further, baseband data on each sub-carrier can be independently modulated, for example, using quadrature amplitude modulation (QAM) or phase-shift keying (PSK) and/or the like. This composite baseband signal can be used to modulate a main RF carrier.

BRIEF SUMMARY

This specification relates system and method for exchanging data items between one or more host services and a plurality of mobile devices.

Other embodiments of this aspect include corresponding systems, apparatus, and computer programs, configured to perform the actions of the methods, encoded on computer storage devices.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. One embodiment may increase the throughput in a communications network, for example, by transmitting signal over one or more carriers, subcarriers, and/or tones that would otherwise be too noisy to transmit over. One embodiment may increase the Signal to Noise Ration (SNR), minimize erroneous data transmissions, reduce susceptibility to interference and/or the like. In turn, these advantages may enhance the user experience.

The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Figure 1:
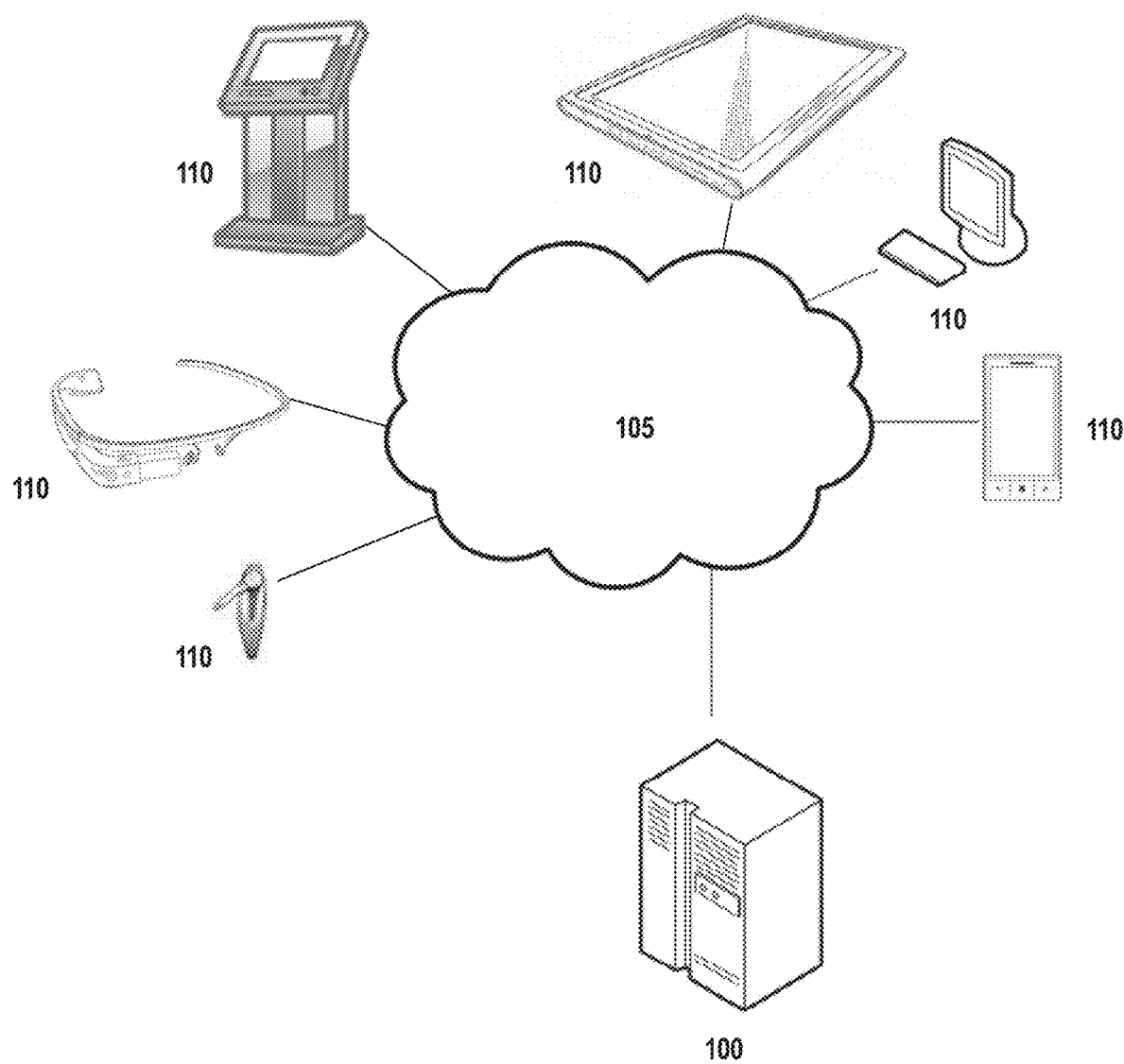
Figure 2:
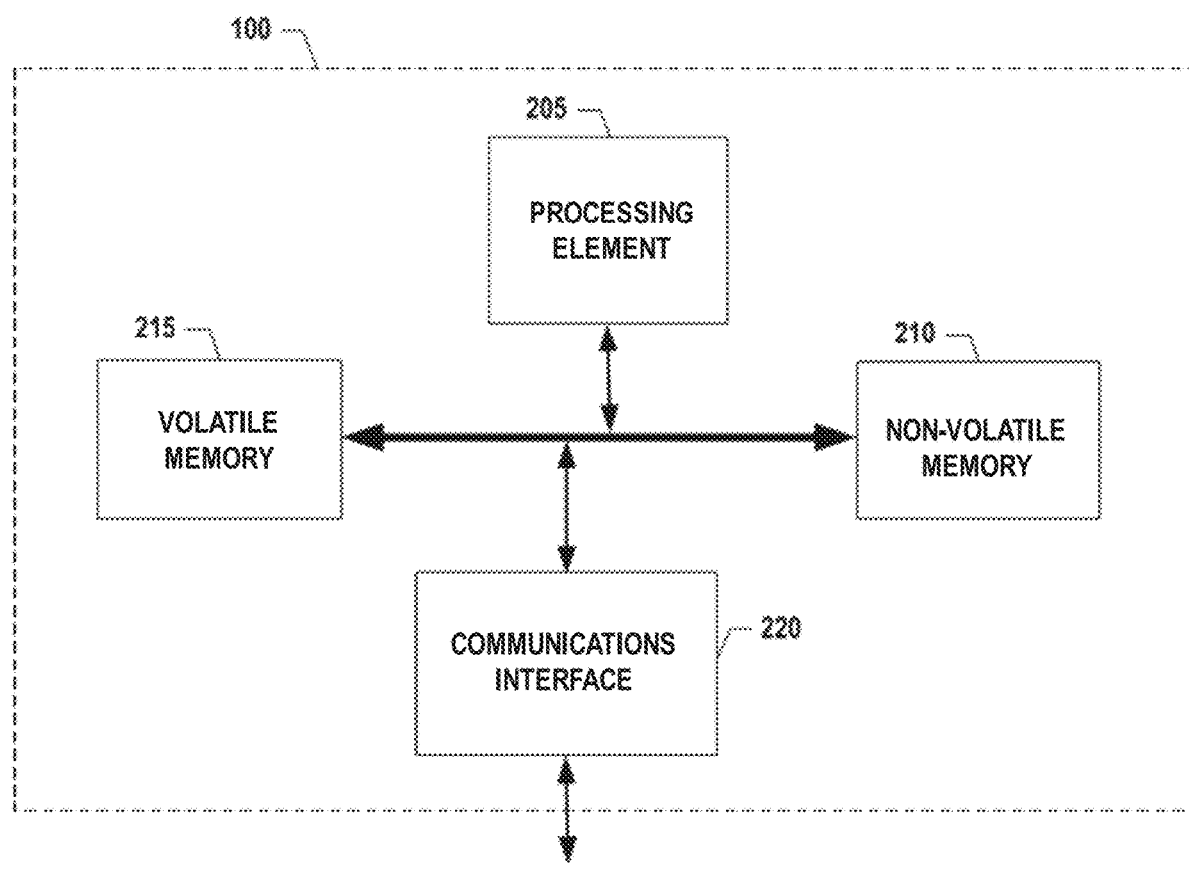
Figure 3:
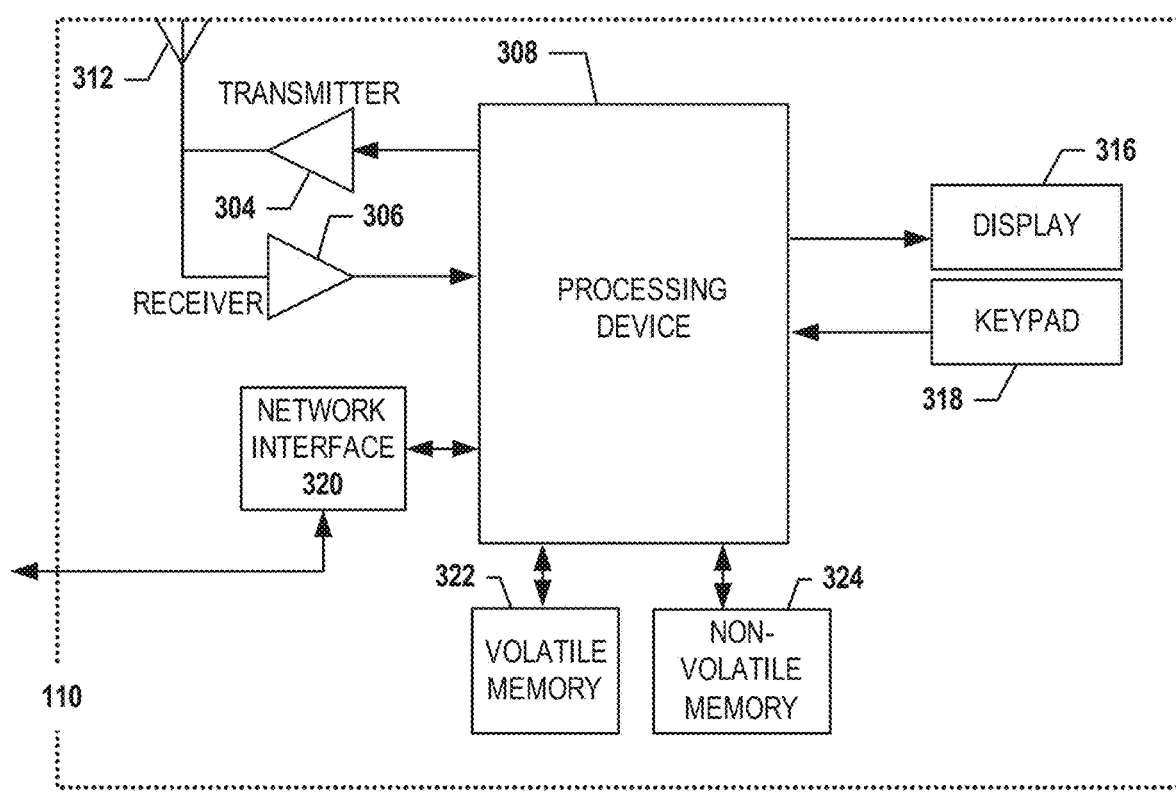
Figure 4:
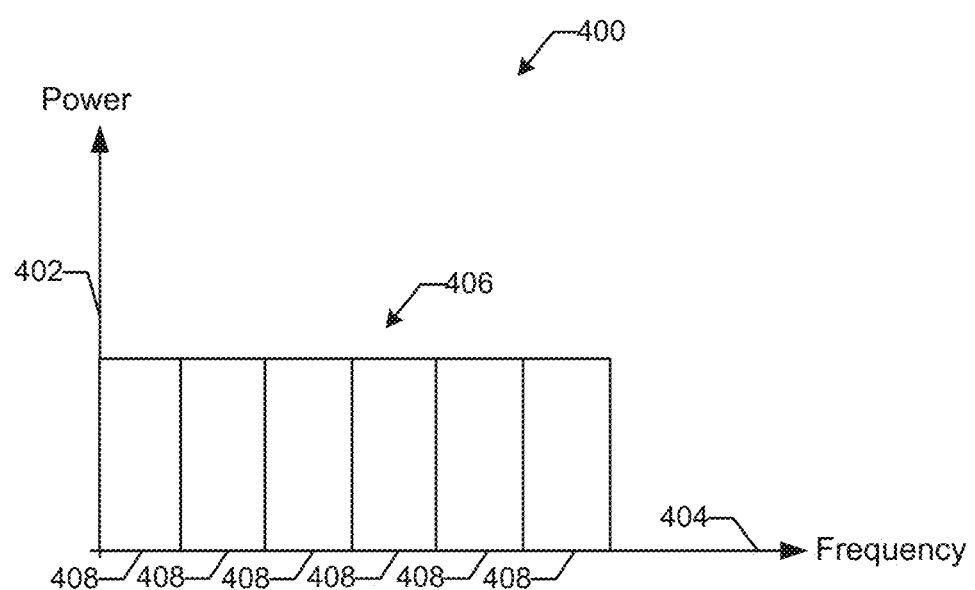
Figure 5:
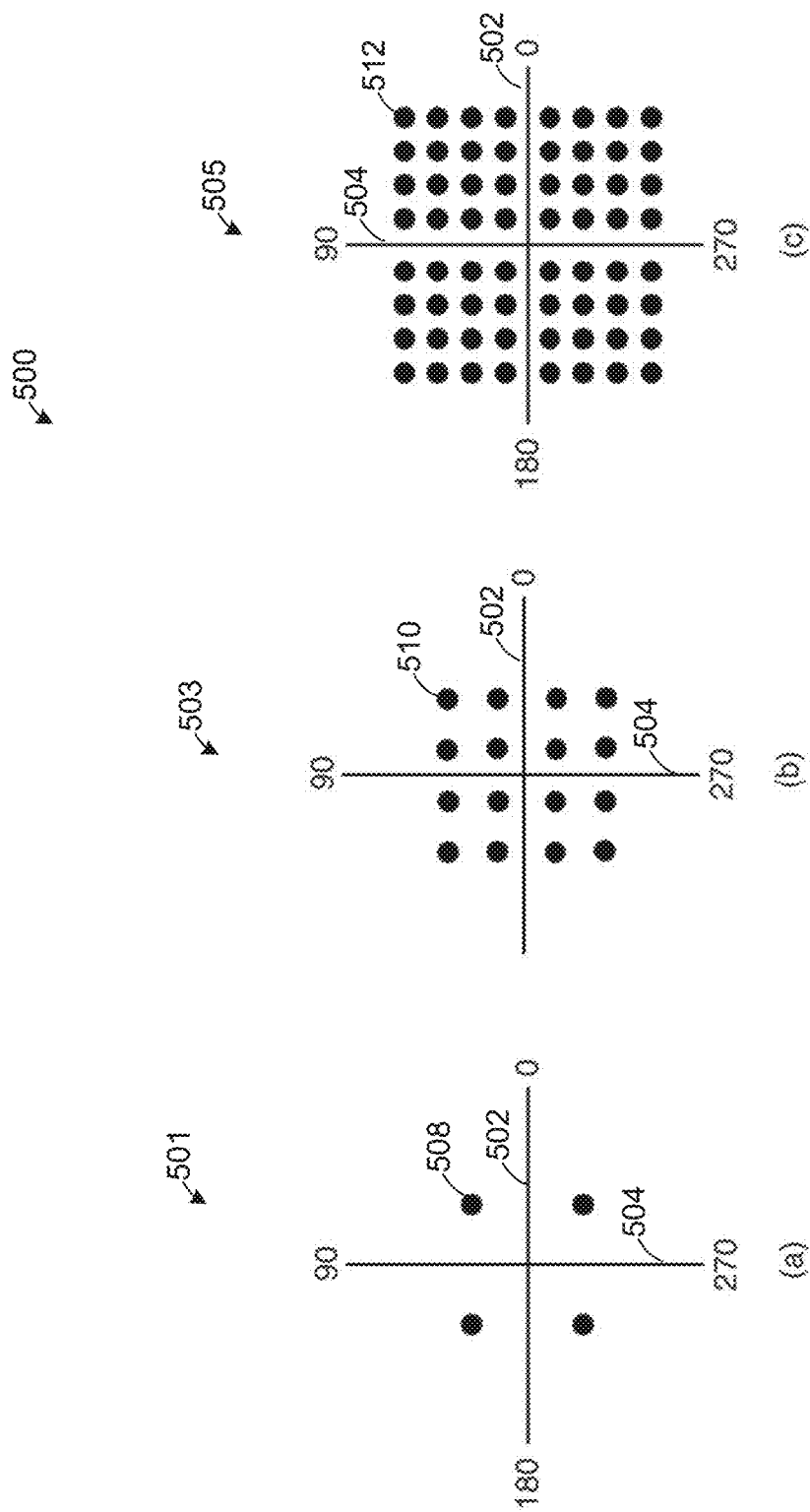
Figure 6A:
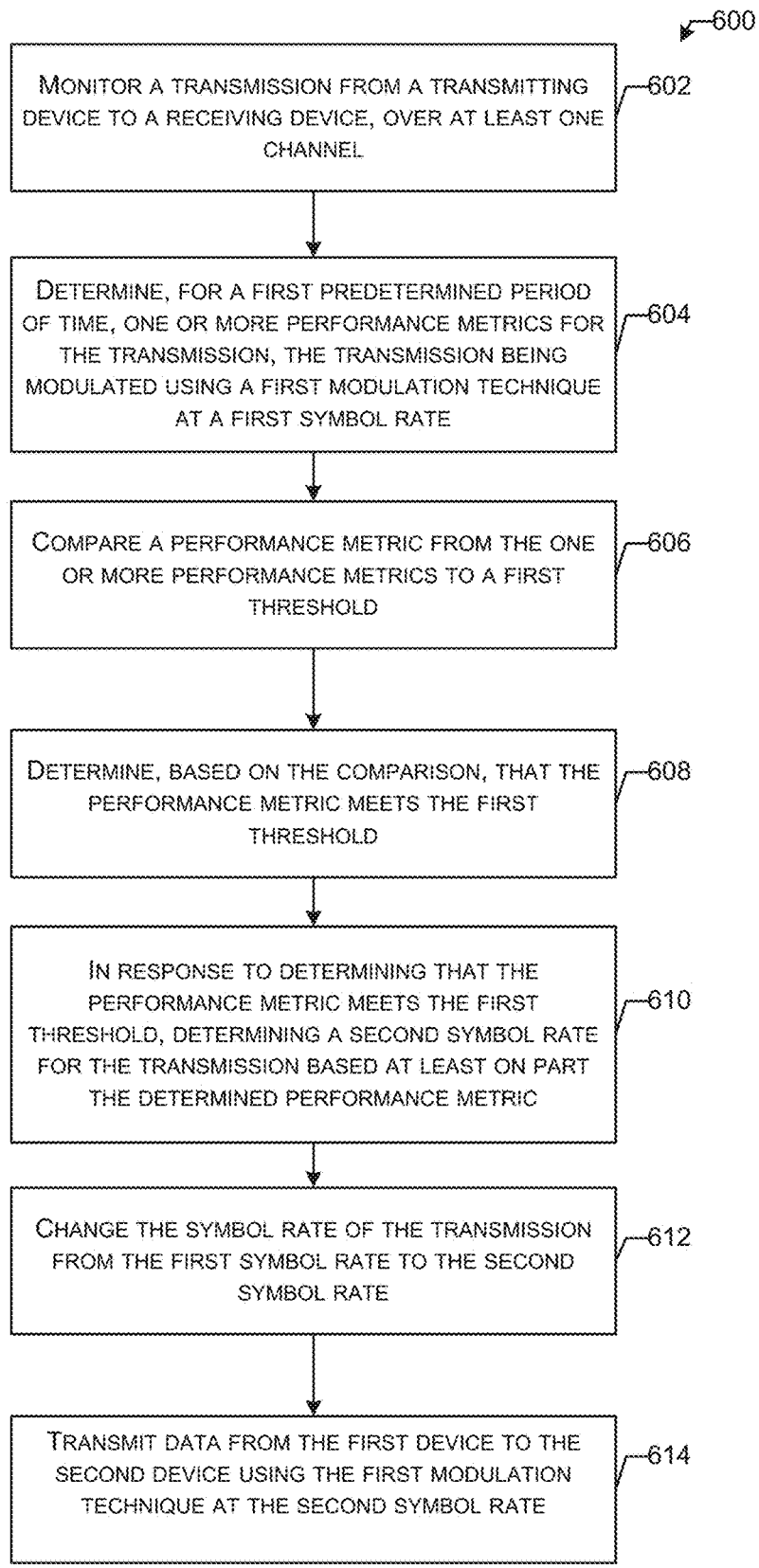
Figure 6B:
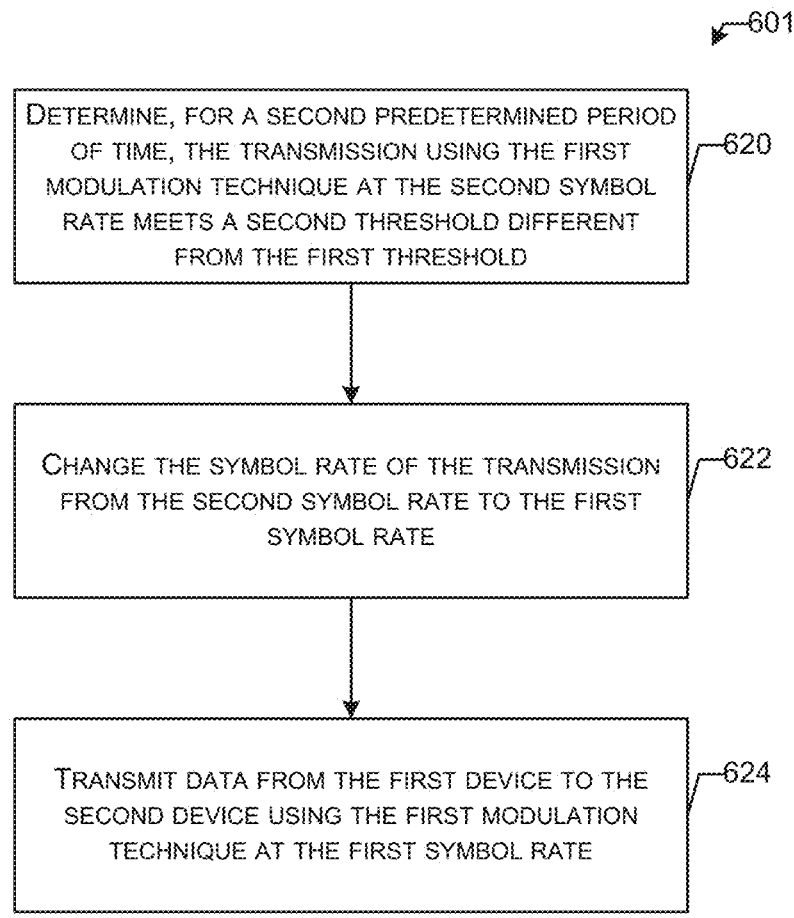
Figure 6C:
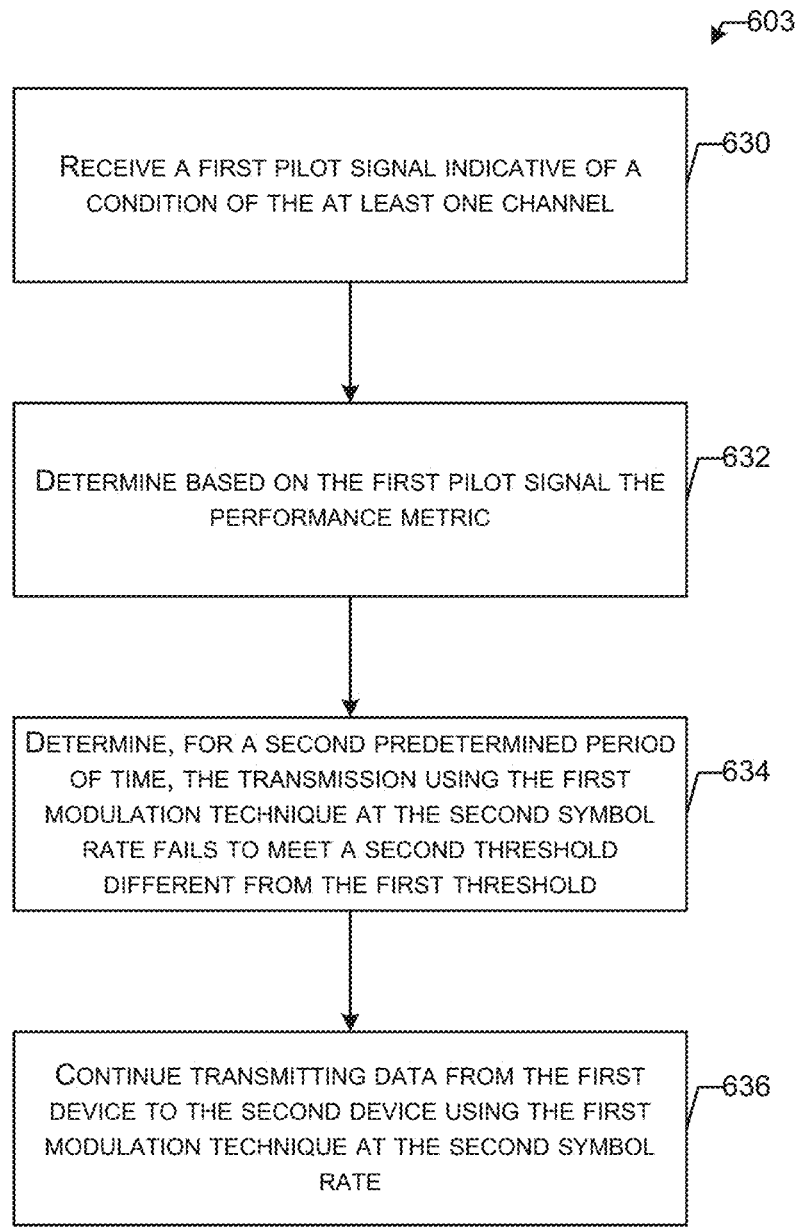

Having thus described the invention in general terms, reference will now be made to the accompanying drawings, which are not necessarily drawn to scale, and wherein:

FIG. 1 shows an overview of a system that can be used to practice embodiments of the present invention;

FIG. 2 shows an exemplary schematic diagram of a management computing entity according to one embodiment of the present invention;

FIG. 3 shows an exemplary schematic diagram of a user computing entity according to one embodiment of the present invention;

FIG. 4 shows an example power spectral diagram that can represent a signal being modulated, for example, according to Quadrature Amplitude Modulation (QAM), Orthogonal Frequency-Division Multiplexing (OFDM), and/or Orthogonal Frequency-Division Multiple Access (OFDMA), in accordance with example embodiments of the disclosure;

FIG. 5 shows example constellation diagrams for different types of QAM in accordance with example embodiments of the disclosure; and FIGS. 6A, 6B, and 6C are flow charts illustrating various procedures and operations that may be completed in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

FIG. 2 provides a schematic of a management computing entity 100 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier computing entity 100 may communicate with user computing entities 110 and/or a variety of other computing entities.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 110 that includes one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

III. Exemplary System Operation

As described above, the management computing entity 100 and/or user computing entity 110 may be configured as described herein.

Orthogonal frequency-division multiplexing (OFDM) can refer to a method of encoding digital data on multiple carrier frequencies. In OFDM, sub-carrier frequencies can be chosen so that the sub-carriers are orthogonal to each other. In one embodiment, this may be done so that cross-talk between the sub-channels is reduced and inter-carrier guard bands are not required. OFDM can be used for digital communication, used in applications such as digital television and audio broadcasting, DSL Internet access, wireless networks, powerline networks, and mobile communications.

In some embodiments, some of the sub-carriers in some of the OFDM symbols may carry pilot signals, for example, for use in connection with a measurement of channel conditions (for example, to determine a gain and/or phase shift for the sub-carriers). In another embodiment, one or more pilot signals and/or training symbols (preambles) may also be used for time synchronization (for example, to avoid intersymbol interference, ISI) and/or frequency synchronization (for example, to avoid inter-carrier interference, ICI).

In one embodiment, an OFDM carrier signal can be the sum of one or more orthogonal sub-carriers and/or tones. Further, baseband data on each sub-carrier can be independently modulated, for example, using quadrature amplitude modulation (QAM) or phase-shift keying (PSK). This composite baseband signal can be used to modulate a main RF carrier.

For example, if a serial stream of binary digits are to be transmitted by a transmitting device. The serial stream of binary digits can be inverse multiplexed, such that the serial stream of binary digits can be first demultiplexed into N parallel streams, and each parallel stream can be mapped to a (possibly complex) symbol stream using a modulation constellation (using, for example, QAM, PSK, and the like). In one embodiment, the constellations may be different, so some streams may have a higher bit-rate than others.

In one embodiment, an inverse fast Fourier transform (FFT) can be computed on each set of symbols, yielding a set of complex time-domain samples. These samples can then be quadrature-mixed to passband. The real and imaginary components can first be converted to the analog domain, for example, using digital-to-analog converters (DACs); the analog signals can then be used to modulate cosine and sine waves at a carrier frequency, $f_c$, respectively. These signals can then be summed to give the transmission signal.

In one embodiment, on the receiving device side, the received signal can be fed and as it is received from an analog to digital converter (ADC) into a channelizer and to one or more gain blocks, and then to the demodulator. In one embodiment, the channelizer can break up the transmission, for example, into individual Orthogonal Frequency Division Multiplex (OFDM) blocks. A FFT can be used to convert back to the frequency domain. This can result in N parallel streams, each of which can be converted to a binary stream using an appropriate symbol detector. These streams can then be re-combined into a serial stream, which can represent an estimate of the original stream at the transmitter.

In one embodiment, the disclosure can be used in connection with OFDM as a modulation scheme, for example, over coaxial cables. In another embodiment, the disclosure can be used in connection with a single carrier QAM as a modulation scheme, for example, over coaxial cables.

As referenced herein, Data Over Cable Service Interface Specification (DOCSIS) can refer to an international telecommunications standard that can permit the addition of high-bandwidth data transfer to an existing cable TV (CATV) system. DOC SIS is employed by cable television operators to provide Internet access (see cable Internet) over their existing hybrid fiber-coaxial (HFC) infrastructure. A DOC SIS architecture can include two primary components: a cable modem located at the customer premises, and a cable modem termination system located at the CATV headend. Cable systems supporting on-demand programming use a hybrid fiber-coaxial system. Fiber optic lines bring digital signals to nodes in the system where they are converted into RF channels and modem signals on coaxial trunk lines.

In one embodiment, DOCSIS technology may use spectrum from approximately 5 MHz to approximately 1200 MHz, which may limited, for example, due to limitations of analog optics and attenuation of the coaxial network. In various embodiments, the disclosure describes using OFDM carriers with adaptive bit-loading to extend the frequency range of DOCSIS above 1200 MHz, for example, to 3 GHz and higher. The disclosure can thereby increase the capacity of the cable network, extending the cable networks useful life for many years.

FIG. 4 shows an example diagram 400 of a power spectral plot that can represent a signal being modulated, for example, according to QAM, OFDM, and/or (OFDMA), in accordance with example embodiments of the disclosure. In particular, FIG. 4 shows power (for example, in units of watts, W) 402 of a transmitted signal 406 plotted against frequency (for example, in units of MHz) 404. In one embodiment, the frequency 404 can range from approximately 0 MHz to approximately 1200 MHz, divided into 200 MHz blocks 408, in accordance with example embodiments of the disclosure. In one embodiment, for Single Carrier (SC) QAM, signals 406 can be transmitted in a first band 408 (for example, approximately 6 MHz wide band) on the downstream, and a band smaller than the first band (for example, a band smaller than approximately 6 MHz, (not shown)) on the upstream.

In one embodiment, the wider the bandwidth of the transmitted signal 406, the more susceptible the signal may be to noise and/or interference. Further, such noise and/or interference can occur in bursts. For example, the use of various electronic devices (for example, a microwave, a mobile device, etc.) proximate to any of the systems described herein, may cause bursts that may substantially interfere (for example, reduce the signal to noise, SNR, ratio) with one or more OFDM and/or QAM subcarrier(s). Noise and/or interference of this kind can alternatively or additionally be referred to as interferers herein.

In another embodiment, in OFDM, the signals 406 can be transmitted using carriers having smaller bandwidth 408 than in QAM. For example, instead of an approximately 6 MHz wide carriers 406 as in OFDM, smaller carrier bandwidth carrier 406 having a smaller bandwidth carrier comprising only approximately 50 KHz bands 408 can be used. In another embodiment, the carriers can be modulated into multi-carrier QAMs. In one embodiment, a single carrier QAM can be 256K QAM. In another embodiment, a multi-carrier QAM can be used to increase the bit-rate to 16K QAM, thereby enabling more data throughput on the network, for example, by using a plurality of smaller-bandwidth carriers, subcarriers, and/or tones. In one embodiment, a burst of noise and/or interference may only compromise the SNR of one small (for example, approximately 50 KHz) carrier, subcarrier, and/or tone, instead of compromising a higher bandwidth carrier using a larger (for example, approximately 6 MHz) band.

FIG. 5 shows a diagram 500 of example constellation plots 501, 503, and 505 for different types of QAM in accordance with example embodiments of the disclosure. In one embodiment, a demodulated carrier can include one or more symbols and can be converted into a two-dimensional representation based on an inphase (I) (x-axis, 502) and the quadrature (Q) (y-axis, 504) modulation representation of the carrier. For example, Binary Phase-shift keying (BPSK) can be represented by a 4 point constellation 501, and 16K QAM can be represented by a 16 point constellation, 503, and 64K QAM can be represented by a 64 point constellation 505. In one embodiment, a portion of constellation points (for example, constellation points as represented by 508, 510, and 512) can represent the various carriers, subcarriers, and/or tones. In one embodiment, pilot carriers, subcarriers, and/or tones can be transmitted as BPSK (either +1 or −1). In another embodiment, the pilot carriers, subcarriers, and/or tones can be used to determine the SNR ratio and/or modulation error rate for the transmission associated with the channel.

Upon reception of the signal by the receiving device, the receiving device can decode the received symbol (for example, using a demodulator), which may have been corrupted by the channel or the receiving device (e.g. additive white Gaussian noise, distortion, phase noise or interference). The receiving device can determine an estimate of what the transmitted signal, for example, by selecting the point (for example, a constellation point as represented by 508, 510, and 512) on the constellation diagram which is closest to that of the received symbol.

In one embodiment, a given block (for example, a 200 MHz block) can be transmitted as an upstream block or a downstream block. In another embodiment, the transmission channel can have noise that may exist in the lower end of the frequency band, or towards the upper end of the frequency band (for example, approximately 700 MHz to approximately 800 MHz).

In one embodiment, adaptive bit loading can be used such that a lower order modulation scheme can be used to overcome through the noise and increase the SNR of the transmitted signal. As used herein, bit-loading can refer to the number of bits that can be transmitted in each carrier and/or subcarrier or tone. The bit-loading can be determined based at least in part on the SNR on the subcarrier. For example, more throughput (for example, more bps/Hz) can be achieved in the network by using subcarriers that have a higher SNR. Further, the bit-loading can serve to maximize the data rate subject to power and bit-error ratio (BER) constraints of the network.

In another embodiment, by reducing the bit loading the noise can have less of an effect on the integrity of signal transmission. For example, with fewer bits and fewer symbols being transmitted, a burst of noise can diminish the SNR of fewer symbols if the transmission is being performed at a lower constellation order than if the transmission is being performed at a higher constellation order.

In one embodiment, the strength of the pilot carriers, subcarriers, and/or tones can be determined and compared with a predetermined threshold. For example, for a signal transmitted at 1K QAM, the signal strength can be determined and can be compared against a threshold of approximately 40 dBmV. As used herein, dBmV (decibels relative to one millivolt) can refer to a measure of the signal strength in wires and cables at RF and AF frequencies. A millivolt is 1/1000 of a volt (0.001 V or $10^{-3}$V). For a signal transmitted at 512K QAM, the predetermined threshold can be 43 dBmV; for a signal transmitted at 256K QAM it can be 46 dBmV. Likewise for 128 K QAM the predetermined threshold can be approximately 46 dBmV, for a signal transmitted at 64 K QAM the predetermined threshold can be approximately 128 dBmV, for a signal transmitted at 32 K QAM the predetermined threshold can be approximately 49 dBmV, and for a signal transmitted at 16 K QAM the predetermined threshold can be approximately 64 dBmV, etc.

In various embodiments, by measuring the signal strength of one or more pilot carriers, subcarriers, and/or tones, a determination can be made to modify the modulation scheme for the symbols. In one embodiment, the modulation can be performed on an entire block, for example, an entire OFDM block. In another embodiment, the modulation can be performed on individual carriers, subcarriers, and/or tones.

In one embodiment, the transmitting device and/or the receiving device can subtract out the pilot carriers, subcarriers, and/or tones from the symbols leaving the transmission data that feeds the OFDM carriers. Once the pilot carriers, subcarriers, and/or tones have been subtracted, the original data to be transmitted can remain. Thus, the data that is received at a receiving device (for example, at the cable modem for downstream communication), may indicate that the signal reception is being impaired at some point in the network. As such, a message can be sent from the receiving device instructing the transmitting device to transmit signals at a lower bit rate, lower symbol rate, and/or a lower bit loading. This can result in an increased power per carriers, subcarriers, and/or tones.

In one embodiment, if upon analyzing the received data by the receiving device over a period of time, losses are observed across several carriers, subcarriers, and/or tones, the receiving device can indicate to the transmitting device to drop those carriers, subcarriers, and/or tones. For example, the transmitting device may be transmitting approximately 10 gigabits on approximately 1200 MHz band of spectrum; further, the receiving device may be detect repeated corruption for a certain channel a predetermined amount of time, for example, approximately one second. The detection of the corruption can be performed, for example, by determining that a Cyclic Redundancy Check (CRC) for the transmission indicates an error.

In one embodiment, if the transmitting device is transmitting device data at a predetermined rate, for example, at 16K QAM, on predetermined carriers, subcarriers, and/or tones and there are no noise and/or interference issues, the transmitting device can continue to transmit data at that rate. Upon an occurrence of an interference signal, a determination can be made, for example, by the receiving device, as to the extent of the interference. For example, the receiving device can determine whether the interference signal affects one or more carriers, subcarriers, and/or tones corresponding to a portion of a band associated with a carrier, subcarrier, and/or tone, or whether the interference is large enough to affect an entire OFDM block. Based on the determination, the transmitting device can scale back the symbol rate by a predetermined amount. For example, for the case of the larger scale interference, the symbol rate can be reduced by approximately 50%; as such, the transmission can go, for example, from 16K QAM down to 8K QAM.

Upon the detection, by the receiving device, of another interferer, or in the alternative, the detection of a persistence of the same or similar interferer, the receiving device can further hone in on which carriers, subcarriers, and/or tones are impacting the signal transmission. For example, the receiving device can determine which symbols and/or which carriers, subcarriers, and/or tones are being affected by the interferes. Consequently, for those carriers, subcarriers, and/or tones, the receiver can communicate a message to the transmitter to reduce the symbol rate on those carriers, subcarriers, and/or tones, for example, to take those carriers, subcarriers, and/or tones down from 8K QAM to 4K QAM. Further, the transmitting device can continue to reduce the symbol rate by a predetermined amount, for example, by approximately 50%, until the symbol rate either reaches a predetermined threshold, for example, 1K QAM.

In one embodiment, if the noise from interferer(s) continues to impact the signal quality, the transmitting device can block out those carriers, subcarriers, and/or tones. In another embodiment, the receiving device may be able to detect this carriers, subcarriers, and/or tones, for example, because the receiving device can have a full band capture capability. In effect, because the OFDM carriers have been blocked, the remaining portion of the received signal in that band can be the interferer; as such, the receiving device can measure the bandwidth, periodicity, power, and other features of the interferer and report this information back to the transmitting device. For example, the receiving device can measure and report to the transmitting device that the interferer is on an approximately 100 KHz wide carrier. The receiving device can further send an indication to the receiving device to take the affected carriers, subcarriers, and/or tones (for example, three approximately 50 KHz wide carriers, subcarriers, and/or tones) and to not transmit on those carriers, subcarriers, and/or tones.

In another embodiment, the receiving device can determine, at another time, that the interferer no longer affects the signal transmission. In such a case, the receiving device can report back to the transmitting device to send the signal at the previously blocked carriers and/or sub carriers.

In one embodiment, if the transmitting device can block out one or more predetermined carriers, subcarriers, and/or tones, for example, because of the considerations made above. In another embodiment, the transmitting device and/or the receiving device can further determine to block out one or more predetermined carriers, subcarriers, and/or tones, based at least in part on a determination of Adjacent Channel Interference (ACI), co-channel interference (CCI), adjacent channel leakage, and/or the like.

In one embodiment, ACI can refer to interference caused by extraneous signals in an adjacent channel. In one embodiment, if the signal is strong enough the adjacent carriers can be impaired at the receiving device. In some cases, carriers, subcarriers, and/or tones can be lost.

In one embodiment, adjacent channel leakage can refer to a transmitting device emitting unwanted signals into a receiving device channel.

In an embodiment, CCI can refer to crosstalk from one or more different transmitting device using the same frequency and/or frequency bands for carriers, subcarriers, and/or tones. In one embodiment, the transmitting device can either turn off those carriers, subcarriers, and/or tones. Alternatively or additionally, the transmitting device can transmit the desired signal(s) at a higher power than the interferes on those carriers, subcarriers, and/or tones. For example, the transmitting device can increase the power of the transmission on the carriers, subcarriers, and/or tones by reducing the bit loading on the affected carriers, subcarriers, and/or tones.

The increase in the power of the transmission on the affected carriers, subcarriers, and/or tones by reducing the symbol rate can be explain with reference to the fact that the power spectral density being measured across the entire band. If the entire band is being received at a first power level, for example, approximately 31 dB, that power may be spread across the entire band. By reducing the symbol rate, the transmitting device reduces the power to any individual carrier, subcarrier, and/or tone, the power of that carrier, subcarrier, and/or tone increases, thereby allowing the transmitting device to overpower interferer signals having a lower power level.

In one embodiment, the transmitting device can turn off one or more carriers, subcarriers, and/or tones carrying information that are affected by the interferer. Further, the receiving device can measure the interferer, and if the transmitter determines it can overpower the interfer, for example, by adjusting the bit loading, it may adjust the bit loading accordingly. Further, the determination to adjust bit loading may be made at least in part based on a consideration of potential ACI and channel leakage. In one embodiment, the determination may further include reduce bit loading on adjacent carriers, subcarriers, and/or tones in addition to the carriers, subcarriers, and/or tones that are being used to transmit the signal. In another embodiment, the determinations may be based at least in part on the bandwidth of the interferer, the power level of the interferer, and/or the periodicity of the interferer. In one embodiment, if the transmitting device determines that the interferer is random and/or intermittent and cannot be predicted within a predetermined tolerance, the transmitting device may determine to turn off data transmission on the affected carriers, subcarriers, and/or tones. In one embodiment, the transmitting device can alternatively or additionally, determine to transmit that data using other carriers, subcarriers, and/or tones.

In one embodiment, the transmitter can be headend. Alternatively or additionally, the transmitting device can be a cable modem at the customer premise.

In one embodiment, the receiving device can be configured to oversample the channel and the received signals, for example, as part of the monitoring of the channel. In one embodiment, a map and for every carrier, subcarrier, and/or tone can be sent by the transmitting device to the receiving device. The receiving device can decode the preamble in the transmission, to determine which carriers, subcarriers, and/or tones to demodulate. For example, the preamble can include a string of predetermined characters (for example, 0F0F0F0F, 1A1A1A1A). When the receiving device detects that string of predetermined characters, the receiving device can determine that the transmission starts at the next bit. In one embodiment, if at the start of the communication and/or at some point during the communication, the receiving device does not detect the string of predetermined characters (for example, because the signal has been affected by an interferer), the receiving device can communicate information indicative of this condition to the transmitting device. In one embodiment, the transmitting device can reduce the bit loading.

In one embodiment, the signal strength of the pilot carriers, subcarriers, and/or tones can be measured by the receiving device and this information can be used to adapt the bit loading. In one embodiment, if the pilot carriers, subcarriers, and/or tones are not received or received having a performance metric below a predetermined threshold, then the receiving device and/or transmitting device can determine that those carriers, subcarriers, and/or tones are being affected by the noise. In one embodiment, the transmitting device can turn the affected carriers, subcarriers, and/or tones off. In another embodiment, the receiving device can obtain a measurement of the interferer on the affected carriers, subcarriers, and/or tones, and then communicate this information to the transmitting device. The transmitting device can make the decision based on the information it received to take an action, for example, keep those carriers, subcarriers, and/or tones off, turn off more carriers, subcarriers, and/or tones, or to reduce the bit loading and change the settings for individual carriers, subcarriers, and/or tones. In one embodiment, as network performance improves (as can be detected by either the receiving device and/or the transmitting device), the bit loading can be increased or decreased appropriately.

In one embodiment, the systems and methods disclosed herein can be implemented in the physical layer of the network. For example, the systems and methods can be implemented in firmware load into the physical layer.

In one embodiment, the number of carriers, subcarriers and/or tones analyzed by the transmitting device can be based at least in part on the characteristics of the interferer. For example, if the interferer has a small bandwidth, for example, if the interferer is approximately 200 KHz, the subcarriers (for example, the four subcarriers) that are being interfered with, four tones to either side of the subcarrier can be blocked.

In one embodiment, the receiving device can measure the power of affected carriers, subcarriers, and/or tones (referred to as tones for short here). As such, the transmitting device can determine the co-channel interference of the transmitted signal on the tones. For example, for a signal being transmitted at a predetermined bandwidth, a predetermined power level, and a predetermined modulation scheme, the transmitting device can first determine the power of the signal on the used tones, determine the adjacent tones, and can determine the power of the interferer. If the power of the interferer is greater than the power of the adjacent tones, then the tones can be turned off in order to avoid leaking into the channels that are on either side of the tones.

In various embodiments the transmitting device can use different QAMs and/or frequencies on the upstream and the downstream. In one embodiment, the transmitting device can throttle the transmission at approximately 16K QAM on the downstream. In another embodiment, the transmitting device can throttle the transmission as high as approximately 800 MHz on the upstream.

In one embodiment, each pilot carrier, subcarrier, and/or tone can cover a certain portion of the constellation that can represent the transmitted signals. In one embodiment, the determination by the receiving device of the level of interference by an interferer, can be based on the received power level of the pilot carriers, subcarriers, and/or tones. For example, the receiving device can classify the interferer into a low interference level interferer, a medium interference level interferer, and a high level interference level based on the degree of power reduction in the received pilot carriers, subcarriers, and/or tones as compared with a predetermined threshold.

In one embodiment, if the receiving device classifies the interferer as a low interference level interferer, the transmitting device can reduce the symbol rate or the modulation rate of the affected carriers and/or subcarriers. As such, those carriers and/or subcarriers transmitted by the transmitting device can be received by the receiving device, for example, because the transmitting device is transmitting the data with more power in those carriers and/or subcarriers.

Alternatively, the receiving device may be receiving noise and no signal at predetermined carriers, subcarriers, and/or tones that it was to receive data on, for example, based on the preamble of one or more signals from the transmitting device. As such, the receiving device can notify the transmitting device, of the lack of received data at the predetermined carriers, subcarriers, and/or tones. The transmitting device can then send a signal to the receiving device requesting that the receiving device detect the signals it is detecting (that is, the interferer) at those carriers, subcarriers, and/or tones. The receiving device can then send a signal to the transmitting device with this information, for example, that the receiving device is detecting an approximately 100 KHz wide, approximately 50 dBmV interferer, which the transmitting device can use to classify the interferer into a low, medium, or high interference level interferer.

For medium and/or high interference level interferer, the transmitting device can determine, based on this classification and/or other information (for example, the bandwidth, periodicity, power, and the like) of the interferer, to block transmissions on one or more affected carriers, subcarriers, and/or tones, and/or transmit data on other, unaffected carriers, subcarriers, and/or tones. This can be performed because, for overcoming the high interference level interferer (for example, by decreasing the bit loading and/or symbol rate), the reduced bit loaded carriers, subcarriers, and/or tones may become powerful enough to affect other channels, for example, through adjacent channel interference and/or adjacent channel leakage.

Alternatively, for medium and/or low interference level interferer, the transmitting device can turn the carriers, subcarriers, and/or tones on and reduce the bit loading. In this case, the reduced bit loaded carriers, subcarriers, and/or tones can be transmitted at a higher power.

In one embodiment, the downstream communication can be monitored for noise and implement the adaptive bit loading constantly while the network is operational, while for the upstream, the adaptive bit loading can be performed as needed, since the communication (and therefore, potential interferers) can be bursting. For example, in one embodiment, the data transmitted by transmitting device can be oversampled by the receiving device at a predetermined sample rate, for example, at about 16 times a second. As another example, for 16K QAM transmission, the channel can be sampled about every approximately 2 to approximately 1000 microseconds. As such, the receiving device can obtain a periodic status of any interferes, where the periodic status is near real-time. As such, the receiving device (and/or a peripheral physical layer device) can periodically send one or more status messages, reporting any potential impairment of the physical layer to the transmitting device. In one embodiment, the measurement of the interferers can be done at the physical layer and/or the media access control (MAC) layers. In one embodiment, the physical layer can periodically update the MAC layer and the MAC layer can periodically build management messages, which can be sent to the transmitting device.

In one embodiment, the receiving device may determine that it received a bad and/or erroneous forward error correction (FEC) block associated with a data frame. For example, when the receiving device computes the Cyclic Redundancy Check (CRC) for the received data frame, the CRC may not sum to zero. As such, the receiving device can discard the received data. Further, the transmitting device at the other end of the communication does not get the acknowledgement from the underlying Transmission Control Protocol (TCP), and therefore, the transmitting device retransmits the block. The transmitting device and/or the receiving device can then determine the problem with the channel. For example, on a downstream cable transmission, there may be 250 customers on a particular channel; further all 250 customers' communications may be impaired because one customer's home is having a communications problem. In this case, the transmitting device can test the connections of the 250 customers and determine the communication status. The transmitting device can determine which home(s) are affected, for example, by keeping track of which homes the transmitting device did not receive an error back.

FIGS. 6A, 6B, and 6C are flow charts illustrating various procedures and operations that may be completed in accordance with various embodiments of the present invention.

In particular, FIGS. 6A-6B shows a flow chart of an example transmitting device operation that may be completed in accordance with various embodiments of the present invention. In block 602, a transmission from a transmitting device to the receiving device, over at least one channel, can be monitored. In one embodiment, the transmission sent by transmitting device can be oversampled by the receiving device at a predetermined sample rate, for example, at about 16 times a second. As another example, for 16K QAM transmission, the channel can be sampled about every approximately 2 to approximately 1000 microseconds. As such, the receiving device can obtain a periodic status of possible interferes, where the periodic status is near real-time. The receiving device (and/or a peripheral physical layer device) can periodically send one or more status messages, reporting any potential impairment of the physical layer to the transmitting device. In one embodiment, the measurement of the interferers can be done at the physical layer and/or the media access control (MAC) layers. In one embodiment, the physical layer can periodically update the MAC layer and the MAC layer can periodically build management messages, which can be sent to the transmitting device.

In block 604, one or more performance metrics for the transmission can be determined for a first predetermined period of time; further, the transmission can be modulated using a first modulation technique at a first symbol rate. In one embodiment, a determination can be made, for example, by the receiving device, as to the extent of an interference to the transmission by one or more interferers. For example, the receiving device can determine whether the interferer affects one or more carriers, subcarriers, and/or tones corresponding to a portion of a band of a carrier, subcarrier, and/or tone, or whether the interferer is large enough to affect an entire OFDM block.

In one embodiment, the performance metric can include an SNR of the transmission. For example, a burst of noise can diminish the SNR. In another embodiment, the performance metric can include a signal strength of the transmission. For example, the signal strength of one or more pilot carriers, subcarriers, and/or tones in the transmission can be determined. In another embodiment, performance metric can include the detection of errors in the transmission. For example, the corruption can be detected, for example, by determining that a Cyclic Redundancy Check (CRC) for the transmission indicates an error.

In one embodiment, the first modulation technique can be a QAM technique. In another embodiment, the first modulation technique can be an OFDM technique. In one embodiment, the first symbol rate can be 16K QAM, 32K QAM, 64K QAM, 128K QAM, or 256K QAM.

In block 606, a performance metric from the one or more performance metrics can be compared to a first threshold. In one embodiment, the transmitting device can compare the SNR, signal strength and/or the error rate of the transmission to a predetermined threshold. In one embodiment, the threshold can be based at least in part on the modulation scheme and/or the transmission medium. In one embodiment, a time average of the performance metric can be used for the comparison to the first threshold.

In block 608, a determination can be made, based on the comparison, that the performance metric meets the first threshold. In one embodiment, the performance may be determined to meet the first threshold if the performance metric, for example, the SNR, signal strength, and/or error rate of the transmission, is equal or less than the threshold. In one embodiment, a time average of the performance metric can be used for the comparison to the first threshold. That is, the performance metric can be determined to meet the first threshold if the performance metric is, on average, equal or less than the threshold value for a predetermined period of time.

In block 610, in response to determining that the performance metric meets the first threshold, a determination can be made for a second symbol rate for the transmission based at least on part the determined performance metric. In various embodiments, by measuring the signal strength of one or more pilot carriers, subcarriers, and/or tones, a determination can be made to modify the symbol rate. In one embodiment, the second symbol rate can be a 16K QAM, 32K QAM, 64K QAM, 128K QAM, and 256K QAM. In another embodiment, the bit rate associated with the first symbol rate may be smaller than the second symbol rate. In one embodiment, the first power per symbol associated with the first symbol rate can be less than a power per symbol associated with the second symbol rate.

In block 612, the symbol rate of the transmission can be changed from the first symbol rate to the second symbol rate. In one embodiment, based on the determination in block 610, the transmitting device can determine to change the symbol rate by a predetermined amount. For example, for the case of a larger level interferer, the symbol rate can be reduced by approximately 50%; as such, the transmission can be reduced, for example, from 16K QAM down to 8K QAM. Optionally, the transmitting device can notify the receiving device of the change prior to making the change in the symbol rate by the predetermined amount.

In block 614, data can be transmitted from the first device to the second device using the first modulation technique at the second symbol rate. In one embodiment, the pilot carriers, subcarriers, and/or tones can be subtracted out of the symbols leaving the transmission data that feeds the OFDM carriers. Once the pilot carriers, subcarriers, and/or tones have been subtracted, the original data to be transmitted can remain. Thus, the data that is received at a receiving device (for example, at the cable modem for downstream communication), may indicate that the signal reception being impaired at some point in the network. As such, a message can be sent from the receiving device instructing the transmitting device to transmit signals at a lower bit rate, lower symbol rate, and/or a lower bit loading. This can result in an increased power per carriers, subcarriers, and/or tones.

In block 620, a determination can be made that, for a second predetermined period of time, the transmission using the first modulation technique at the second symbol rate meets a second threshold different from the first threshold. Upon the detection, by the receiving device, of another interferences signal, or in the alternative, the detection a persistence of the same interference signal, the receiving device can further hone in on which subcarriers are impacting the signal transmissions. For example, the receiving device can determine which symbols and/or which carriers, subcarriers, and/or tones are being affected by the interferences. Consequently, for those carriers, subcarriers, and/or tones, the receiver can communicate a message to the transmitter to take those carriers, subcarriers, and/or tones down from 8K QAM to 4K QAM.

In one embodiment, the receiving device can measure the power of affected carriers, subcarriers, and/or tones. As such, the transmitting device can determine the co-channel interference. For example, if the signal being transmitted is an approximately 200 KHz wide signal at approximately 50 dB at a predetermined modulation, the transmitting device can determine the power of the signal. And if the power of the interferer is greater than the power of those carriers, subcarriers, and/or tones, you have to make up enough carriers, subcarriers, and/or tones the adjacent carriers, subcarriers, and/or tones to the subcarrier can be turned off in order to avoid leaking into the channels that are on either side of the carriers, subcarriers, and/or tones.

In block 622, the symbol rate of the transmission can be changed from the second symbol rate to the first symbol rate. In one embodiment, if the noise continues to impact the signal quality, the transmitting device can block out those carriers, subcarriers, and/or tones. In another embodiment, the receiving device may be able to detect these carriers, subcarriers, and/or tones, for example, because the receiving device has full band capture capability. In effect, because the carriers, subcarriers, and/or tones have been blocked, the remaining portion of the received signal in that band can be the interferer; as such, the receiving device can measure the bandwidth, periodicity, power, and other features of the interferer and report this information back to the transmitting device. For example, the receiving device can measure and report to the transmitting device that the interferer has an approximately 100 KHz wide carrier, subcarrier, and/or tone. The receiving device can further send an indication to the receiving device to take the affected carriers, subcarriers, and/or tones (for example, three approximately 50 KHz wide carriers, subcarriers, and/or tones) and to not transmit on those carriers, subcarriers, and/or tones.

In block 624, data can be transmitted from the transmitter to the receiver using the first modulation technique at the first symbol rate. In one example, the transmitting device may be a transmitter and the receiving device may be a receiver. In one implementation, the symbol rate may be maintained for a first period of time. In one implementation, the symbol rate may be changed after expiration of the first period. Similarly, the modulation technique may be changed or altered after expiration of the first period of time.

In particular, FIGS. 6A-6B shows a flow chart of an example receiving device operation that may be completed in accordance with various embodiments of the present invention. In block 630, a first signal indicative of a condition of the at least one channel can be received, for example, by a receiver. In one embodiment, each signal carrier, subcarrier, and/or tone can cover a certain portion of the constellation, that is, each signal carrier, subcarrier, and/or tone can cover a certain amount of the transmitted signal. In one embodiment, the first signal can be a pilot signal. In one embodiment, each pilot carrier, subcarrier, and/or tone can cover a certain portion of the constellation, that is, each pilot carrier, subcarrier, and/or tone can cover a certain amount of the transmitted signals.

In block 632, the at least one channel can be measured for channel conditions. In one embodiment, one or more performance metrics can be determined based on the measured channel and/or the received first signal. In one embodiment, the channel measurements and/or determination can be made by the receiving device as to the SNR ratio and/or the level of interference by an interferer, and can be based on the received power level of the pilots. For example, the receiving device can classify the interferer into a low interference level interferer, a medium interference level interferer, and a high level interference level based on the degree of power reduction in the received pilot as compared with a predetermined threshold. In one implementation, a signal indicative of the performance metric may be transmitted from the receiver to, for example, the transmitter.

In block 634, the transmission can be received using the first modulation technique at the second symbol rate for a second predetermined period of time; further a determination can be made that the received transmission fails to meet a second threshold different from the first threshold. In one embodiment, the performance may be determined to fail to meet the second threshold if the performance metric, for example, the SNR, signal strength, and/or error rate of the transmission, is equal or less than the threshold value. In one embodiment, a time average of the performance metric can be used for the comparison to the first threshold. That is, the performance metric can be determined to meet the second threshold if the performance metric is, on average, equal or less than the threshold value for a predetermined period of time.

In block 636, data can continue to be transmitted from the first device to the second device using the first modulation technique at the second symbol rate. In one embodiment, the first modulation technique can be a QAM technique. In another embodiment, the first modulation technique can be an OFDM technique. In one embodiment, the second symbol rate can be 16K QAM, 32K QAM, 64K QAM, 128K QAM, or 256K QAM. In one embodiment, if the transmitting device is transmitting device data at a predetermined rate, for example, at 16K QAM, on predetermined subcarriers and there are no noise and/or interference issues, the transmitting device can continue to transmit data at that rate.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
    identifying a first transmission from a first device to a second device over a first frequency band for a first period of time, wherein the first transmission uses a first symbol rate;
    determining, for the first period of time, a performance metric associated with the first transmission over the first frequency band;
    determining that the performance metric fails to satisfy a threshold value;
    ceasing transmission on a second frequency band adjacent to the first frequency band;
    determining that an interference signal remains on the second frequency band subsequent to ceasing transmission on the second frequency band;
    determining interference at the first frequency band originating from the second frequency band based on the determination that the performance metric fails to satisfy the threshold and the determination that the interference signal remains on the second frequency band subsequent to ceasing transmission on the second frequency band; and
    sending an instruction to transmit a second transmission in the first frequency band using a second symbol rate, the second symbol rate being lower than the first symbol rate.

2. The method of claim 1, wherein the performance metric comprises a signal to noise ratio.

3. The method of claim 1, wherein the first transmission is modulated using at least one of: an Orthogonal Frequency Division Multiplexing (OFDM) technique or a Quadrature Amplitude Modulation (QAM) technique.

4. The method of claim 1 wherein the first symbol rate is one of 16K QAM, 32K QAM, 64K QAM, 128K QAM, and 256K QAM and the second symbol rate is one of 16K QAM, 32K QAM, 64K QAM, 128K QAM, and 256K QAM.

5. The method of claim 4, wherein bits per symbol for the first symbol rate are larger than the bits per symbol for the second symbol rate.

6. The method of claim 4, wherein a bit rate associated with the first symbol rate is smaller than the second symbol rate.

7. The method of claim 1, wherein the first transmission comprises first subcarriers and second subcarriers.

8. The method of claim 1, further comprising:
    receiving a pilot subcarrier indicative of a condition of the first frequency band, wherein determining the performance metric is based on the pilot subcarrier.

9. A system comprising:
    a first device; and
    a second device in communication with the first device;
    wherein the first device is configured to:
        send a first signal over a frequency band to the second device, the first signal comprising a first portion transmitted over a first portion of the frequency band and a second portion transmitted over a second portion of the frequency band;
        receive, from the second device, an indication that a performance metric associated with the first portion of the first signal fails to satisfy a threshold value;
        cease transmission on the first portion of the frequency band;
        receive an indication that an interference signal remains on the first portion of the frequency band subsequent to ceasing transmission on the first portion of the frequency band; and
        send, based on the indication from the second device that the performance metric associated with the first portion of the first signal fails to satisfy the threshold value and the indication that the interference signal remains on the first portion of the frequency band subsequent to ceasing transmission on the first portion of the frequency band, a second signal to the second device over the frequency band using the second portion of the frequency band and not using the first portion of the frequency band.

10. The system of claim 9, wherein the performance metric comprises a signal to noise ratio.

11. The system of claim 9, wherein the first signal comprises first subcarriers and second subcarriers, wherein the first subcarriers are transmitted over the first portion of the frequency band and the second subcarriers are transmitted over the second portion of the frequency band, wherein the first signal uses a first symbol rate.

12. The system of claim 9, wherein the first signal is modulated using a Quadrature Amplitude Modulation (QAM) technique.

13. The system of claim 9, wherein the first signal is modulated using an Orthogonal Frequency Division Multiplexing (OFDM) technique.

14. The system of claim 11 wherein the first symbol rate is one of 16K QAM, 32K QAM, 64K QAM, 128K QAM, and 256K QAM.

15. The system of claim 9, wherein the second device is configured to monitor a second transmission between the first device and the second device over the frequency band, wherein the second transmission is transmitted using the second portion of the frequency band and not using the first portion of the frequency band, wherein the first signal uses a first symbol rate, wherein the second transmission uses a second symbol rate, and wherein a first power per symbol associated with the first symbol rate is less than a power per symbol associated with the second symbol rate.

16. The system of claim 15, wherein bits per symbol for the first symbol rate are larger than the bits per symbol for the second symbol rate.

17. The system of claim 15, wherein a bit rate associated with the first symbol rate is smaller than the second symbol rate.

18. A method comprising:
monitoring a first signal from a first device over a frequency band to a second device, wherein the first signal comprises a first portion transmitted over a first portion of the frequency band and a second portion transmitted over a second portion of the frequency band;
determining a performance metric associated with the first portion of the first signal;
comparing the performance metric to a threshold;
determining that the performance metric fails to satisfy the threshold;
ceasing transmission on the first portion of the frequency band;
determining that an interference signal remains on the first portion of the frequency band subsequent to ceasing transmission on the first portion of the frequency band;
providing, based on the determination that the performance metric associated with the first portion of the first signal fails to satisfy the threshold and the determination that the interference signal remains on the first portion of the frequency band subsequent to ceasing transmission on the first portion of the frequency band, an indication to the first device to transmit using the second portion of the frequency band and not using the first portion of the frequency band; and
monitoring a second signal between the first device and the second device over the frequency band, wherein the second signal is transmitted using the second portion of the frequency band and not using the first portion of the frequency band.

* * * * *